(12) United States Patent
Watanabe et al.

(10) Patent No.: US 7,872,381 B2
(45) Date of Patent: Jan. 18, 2011

(54) COUNTER-ROTATING AXIAL-FLOW FAN

(75) Inventors: Jiro Watanabe, Nagano (JP); Toshiya Nishizawa, Nagano (JP); Yasuhiro Maruyama, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 75 days.

(21) Appl. No.: 12/513,938

(22) PCT Filed: Nov. 5, 2007

(86) PCT No.: PCT/JP2007/071469

§ 371 (c)(1),
(2), (4) Date: May 7, 2009

(87) PCT Pub. No.: WO2008/056624

PCT Pub. Date: May 15, 2008

(65) Prior Publication Data

US 2010/0033041 A1 Feb. 11, 2010

(30) Foreign Application Priority Data

Nov. 8, 2006 (JP) .............................. 2006-303305

(51) Int. Cl.
*H02K 9/06* (2006.01)
*F04D 25/16* (2006.01)

(52) U.S. Cl. ............................ 310/58; 310/62; 310/89; 415/68; 415/199.5

(58) Field of Classification Search .................. 310/58, 310/62, 89; 415/68, 199.4, 199.5; 416/128, 416/198 R
See application file for complete search history.

(56) References Cited

U.S. PATENT DOCUMENTS

| 6,648,065 | B2 | 11/2003 | Huang et al. |
| 6,904,960 | B1 * | 6/2005 | Su et al. ..................... 165/122 |
| 7,112,905 | B2 | 9/2006 | Chang et al. |
| 7,156,611 | B2 * | 1/2007 | Oosawa et al. ................ 415/68 |
| 7,175,399 | B2 * | 2/2007 | Matsumoto et al. .... 417/423.15 |
| 7,541,702 | B2 * | 6/2009 | Murakami et al. ............ 310/62 |
| 2005/0106026 | A1 | 5/2005 | Oosawa et al. |
| 2008/0260530 | A1 * | 10/2008 | Nishizawa et al. .......... 415/220 |

FOREIGN PATENT DOCUMENTS

| JP | 58-159889 | 10/1983 |
| JP | 10-210727 | 8/1998 |
| JP | 2000-356200 | 12/2000 |

* cited by examiner

*Primary Examiner*—Tran N Nguyen
(74) *Attorney, Agent, or Firm*—Rankin, Hill & Clark LLP

(57) ABSTRACT

A counter-rotating axial-flow fan is provided that is capable of increasing effect of cooling a stator. One or more through-holes 83 penetrating support frame bodies (21, 75) in the axial direction are formed in support frame bodies 21 and 75. One or more vent holes 57a for introducing air, sucked from a suction port 19, into a cup-like member 51 are formed in a bottom wall portion 57 of a cup-like member 51 of a first impeller 9. One or more vent holes 111a for discharging air, introduced into an internal space of a second motor 61, to the outside are formed in a bottom wall portion 111 of a cup-like member 105 of a second impeller 63.

8 Claims, 6 Drawing Sheets

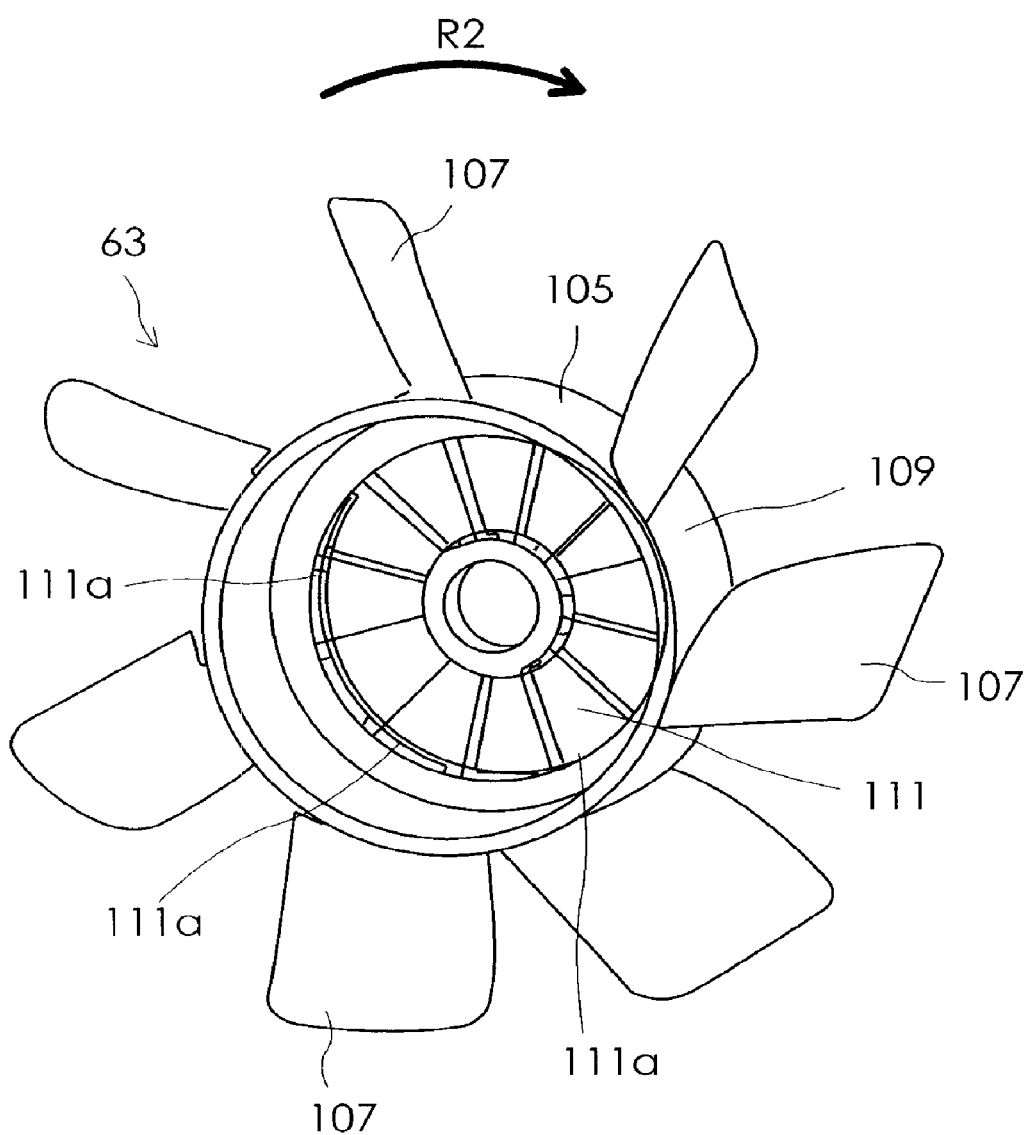

COUNTER-ROTATING AXIAL-FLOW FAN

TECHNICAL FIELD

The present invention relates to a counter-rotating axial-flow fan used to cool an interior of an electric appliance.

BACKGROUND ART

Japanese Patent Publication No. 2004-278371 (JP2004-278371A) (Patent Document 1) discloses, in FIGS. 1 to 4, a counter-rotating axial-flow fan including a housing constituted by a housing body having an air channel therein, which has a suction port portion on one end thereof and a discharge port on the other end in an axial direction and a motor support frame arranged in a center portion of the air channel. In this counter-rotating axial-flow fan, a first impeller rotated by a first motor is arranged in a first space between the motor support frame in the housing and suction port. Further, a second impeller rotated by a second motor is arranged in a second space between the motor support frame in the housing and discharge port. The first and second impellers are rotated in mutually opposite directions. The first and second motors each have a rotary shaft, a stator, and a rotor rotating around the stator. The first and second motors are arranged respectively in the first and second spaces such that the axial lines of the rotary shafts thereof extend along a virtual center line connecting the center of the suction port and the center of the discharge port. The stator of the first motor and stator of the second motor are fixed to the support frame body. A problem with a motor of this kind is to suppress an increase in the temperature of the inside of the motor. Japanese Utility Model Publication No. 58-159889 (JPU 58-159889A) (Patent Document 2) and Japanese Patent Publication No. 10-210727 (JP 10-210727A) (Patent Document 3) disclose a technique by which to cool a stator of a single motor by using air introduced through a vent hole formed in a rotor of the motor. Further, Japanese Patent Publication No. 2000-356200 (JP2000-356200A) (Patent Document 4) discloses a technique by which to circulate air introduced into an interior of a motor through a vent hole formed in a casing of the motor by means of rotations of an impeller of the motor in a single axial-flow fan.

DISCLOSURE OF THE INVENTION

Problems to be Solved by the Invention

However, there has been a problem with the counter-rotating axial-flow fan as described below. When the size of the impeller is increased and, correspondingly, motor current is increased, even if the vent hole is formed in the rotor or the like, heat generated from a stator of the motor is accumulated in the internal space of the each motor. As a result, the temperature of the inside of the motor exceeds an allowable point, which prevents full use of motor capability.

Accordingly, an object of the present invention is to provide a counter-rotating axial-flow fan capable of decreasing the temperature of the inside of the motor so as to make the most of its capability.

Means for Solving the Problems

A counter-rotating axial-flow fan according to the present invention includes a housing, a first impeller, a first motor, a second impeller, and a second motor. The housing includes a housing body having an air channel formed therein and a motor support frame provided in a center portion of the air channel. The air channel has a suction port on one end and a discharge port on the other end in an axial direction. The first impeller is arranged within a first space defined between the motor support frame and the suction port in the housing and has a plurality of blades. The first motor rotates the first impeller within the first space in a first rotating direction. The second impeller is arranged within a second space defined between the motor support frame and the discharge port in the housing and has a plurality of blades. The second motor rotates the second impeller within the second space in a second rotating direction which is opposite to the first rotating direction. The first and second motors each have a rotary shaft and a rotor rotating around the stator. The motor support frame includes a support frame body positioned in the center portion of the air channel and a plurality of webs arranged between the support frame body and the housing body at predetermined intervals in a circumferential direction of the rotary shafts so as to connect the support frame body and housing body. The first and second motors are arranged within the first and second spaces respectively such that axial lines of the rotary shafts extend along a virtual center line connecting the center of the suction port and the center of the discharge port. The stator of the first motor and the stator of the second motor are fixed onto the support frame body. In the present invention, the first impeller and the rotor of the first motor are configured to introduce air sucked through the suction port into an internal space of the first motor. One or more through-holes which penetrate the support frame body in an extending direction of the axial line are formed in the support frame body. Positions and a total cross sectional area of the one or more through-holes are defined to introduce or guide the air, which has been introduced into the internal space of the first motor, into the internal space of the second motor so as to directly cool the stator of the first motor and the stator of the second motor.

In the counter-rotating axial-flow fan according to the present invention, when the first impeller rotates in the first rotating direction and the second impeller rotates in the second rotating direction opposite to the first rotating direction, air sucked through the suction port is introduced into the internal space of the first motor. Then, part of the air introduced into the internal space of the first motor passes through the one or more through-holes penetrating the support frame body and then introduced into the internal space of the second motor. The stator of the first motor and the stator of the second motor can directly be cooled by the air flow as described above. This increases effect of cooling the stator, whereby the temperature of the inside of the motor can be decreased. In particular, if it is possible to decrease the temperature of the inside of the first motor that is likely to rise, a counter-rotating axial-flow fan can be obtained that is capable of making the most of the capability of the first and second motors.

The second impeller and the rotor of the second motor are preferably configured to discharge the air, which has been introduced in the internal space of the second motor, to the outside. With this configuration, the air that has been introduced into the internal space of the second motor is efficiently discharged to the outside, thereby further increasing effect of cooling the stator of the second motor.

The one or more through-holes are preferably arranged at equal intervals in the circumferential direction of the rotary shaft. With this configuration, a bias does not occur in the air flow to be introduced through the one or more through-holes into the internal space of the second motor, thereby effectively cooling the entire stator.

The housing may be constituted by first and second housing units coupled by a coupling structure. In this configuration, the first housing unit includes a first housing-body half-portion having the suction port on one end thereof and the first space therein, and a first support-frame half-portion which is one of two parts obtained by dividing the motor support frame at the dividing plane to which the virtual center line is a normal line. The second housing unit includes a second housing-body half-portion having the discharge port on one end thereof and the second space therein, and a second support-frame half-portion which is the other one of the two parts obtained by dividing the motor support frame at the dividing plane to which the virtual center line is a normal line. One or more through-hole half-portions are formed in the first and second support-frame half-portions. The through-hole half-portions are aligned together to form the one or more through-holes with the first and second housing units being coupled by the coupling structure. With this configuration, it is possible to obtain a desired counter-rotating axial-flow fan by selecting different types of motors and impellers to be arranged in the housing according to the usage and purpose and combining the first housing unit of one axial-flow fan thus selected and the second housing unit of the other axial-flow fan thus selected.

The first impeller may include a cup-like member having a peripheral wall portion onto which the plurality of blades are fixed and a bottom wall portion which is integrally formed with one end of the peripheral wall portion and to which one end of the rotary shaft is connected. In this configuration, the rotor is constituted by an annular member fixed inside the peripheral wall portion of the cup-like member and a plurality of permanent magnets fixed onto an inner peripheral surface of the annular member. Further, one or more vent holes may be formed in the bottom wall portion of the cup-like member of the first impeller, through which the air that has been introduced through the suction port is introduced into the inside of the cup-like member. With this configuration, the first impeller and the rotor of the first motor can readily be configured to introduce the air sucked through the suction port into an internal space of the first motor.

The stators of the first and second motors may each have a stator core, exciting windings attached to the stator core, and a circuit board on which an exciting current supply circuit for flowing exciting current to the exciting windings is mounted. The circuit boards of the first and second motors may each be arranged to extend along the support frame body, being disposed apart from the support frame body by a predetermined distance. In this configuration, one or more board through-holes are preferably formed in the circuit boards, through which the air to be directed to the one or more through-holes or air that has passed through the one or more through-holes passes. With this configuration, the air flowing in the internal spaces of the first and second motors passes through the one or more through-holes, thereby preventing the air flow from being interrupted by the circuit board.

The first support-frame half-portion may have a first support-frame-body half-portion constituting the half portion of the support frame body, and the second support-frame half-portion may have a second support-frame-body half-portion constituting the remaining half portion of the support frame body. A first bearing holder into which a bearing for supporting the rotary shaft of the first motor is fitted may be fixed to an center portion of the first support-frame-body half-portion, and a second bearing holder into which a bearing for supporting the rotary shaft of the second motor is fitted may be fixed to an center portion of the second support-frame-body half-portion. In this configuration, the first and second bearing holders are preferably contact each other thermo-conductively or in a heat conductive state with the first and second housing units being coupled. Generally, in the counter-rotating axial-flow fan, the temperature of the stator of the first motor is more likely to rise than that of the stator of the second motor. Therefore, by bringing the first bearing holder and the second bearing holder into contact with each other in a heat conductive state, it is possible to allow heat generated in the stator of the first motor to escape to the second motor side through the first and second bearing holders, thereby preventing the stator of the first motor from being heated.

In this configuration, the first and second bearing holders are preferably made of metal. With this, heat conductivity between the first and second bearing holders is increased, thereby easily allowing the heat generated in the stator of the first motor to escape to the second motor side.

BRIEF DESCRIPTION OF THE DRAWINGS

FIG. 6 is a perspective view showing a second impeller used in the counter-rotating axial-flow fan of FIG. 1.

BEST MODE FOR CARRYING OUT THE INVENTION

Figure 1:
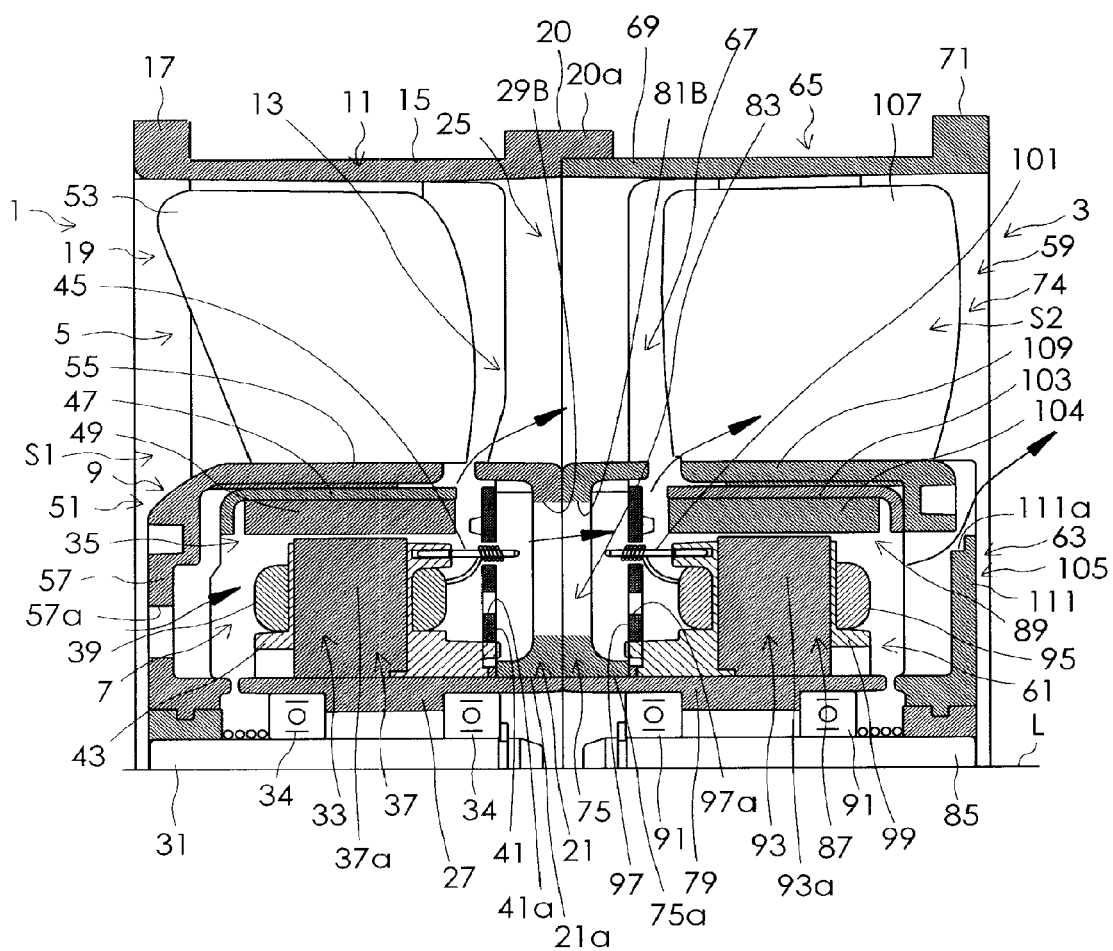
FIG. 1 is a vertical cross-sectional view showing a half portion of a counter-rotating axial-flow fan according to an embodiment of the present invention.

An embodiment of the present invention will be described in detail below with reference to the accompanying drawings. FIG. 1 is a vertical cross-sectional view showing a half portion of a counter-rotating axial-flow fan according to an embodiment of the present invention. As shown in FIG. 1, the counter-rotating axial-flow fan according to the present invention is configured by combining a first single axial-flow fan 1 and a second single axial-flow fan 3 though a coupling structure. The first single axial-flow fan 1 includes a first housing unit 5, a first motor 7 arranged in the first housing unit 5, and a first impeller 9.

Figure 2:
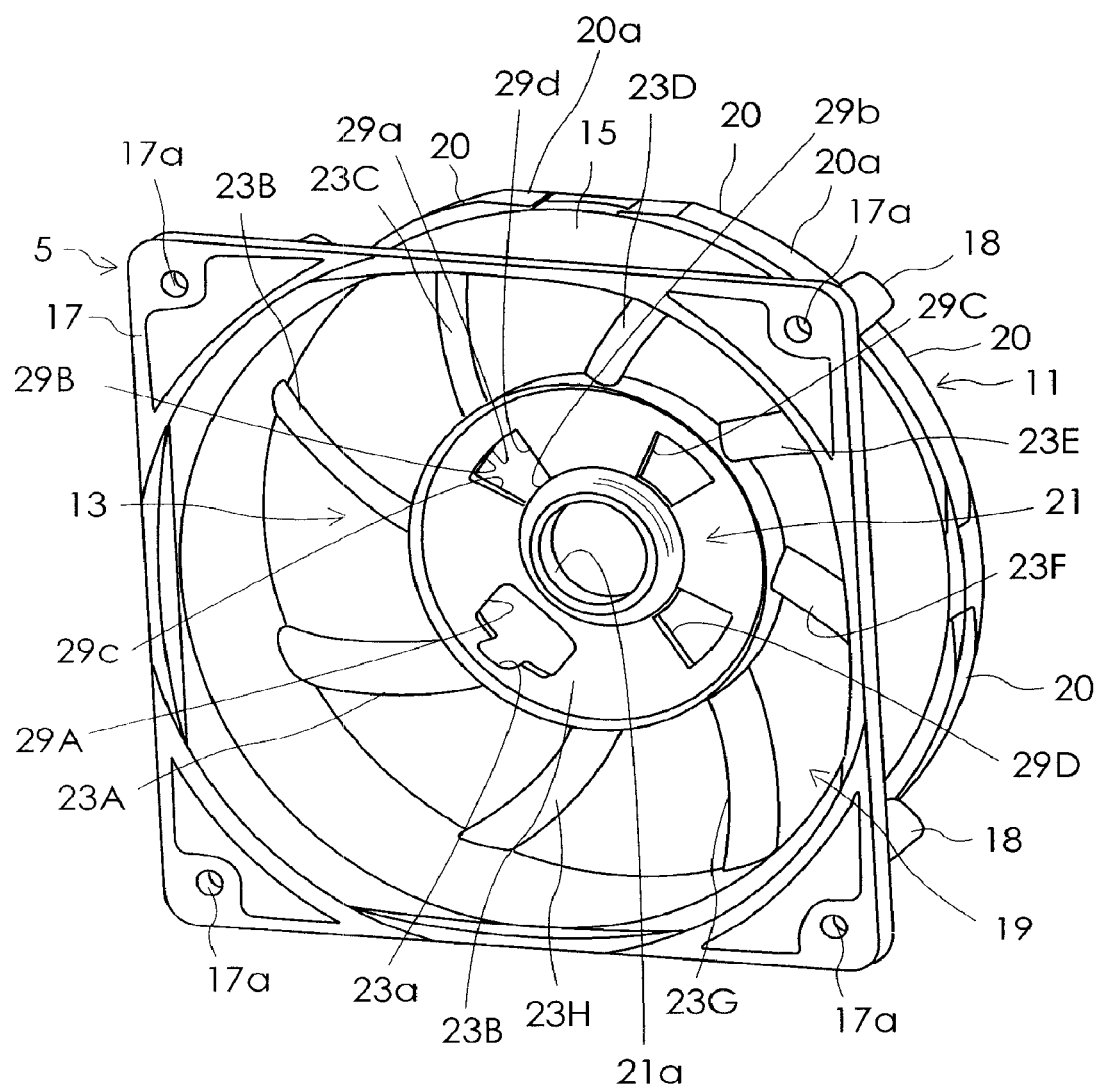
FIG. 2 is a perspective view showing a first housing unit used in the counter-rotating axial-flow fan of FIG. 1.

As shown in FIG. 2, the first housing unit 5, which is made of a synthetic resin or aluminum, integrally includes a first housing-body half-portion 11 and a first support-frame half-portion 13. The first housing-body half-portion 11 includes a cylinder portion 15, a suction-side flange 17, four first reinforcing ribs 18, and eight fitting projections 20. The cylinder portion 15 is of a cylindrical shape to form an air channel therein. The suction-side flange 17 is provided on one end of the air channel. The suction-side flange 17 has a square profile and has a suction port 19 therein. At the four corners of the suction-side flange 17, through-holes 17a through which fixtures for mounting the counter-rotating axial-flow fan to an electric appliance are inserted are formed. The four first reinforcing ribs 18 are arranged on the cylinder portion 15 at equal intervals in a circumferential direction of a rotary shaft 31 of the first motor 7, described later, such that distal ends thereof extend in the axial direction from the end of the cylinder portion 15 so as to project toward the second single axial-flow fan 3. The eight fitting projections 20 are formed on the cylinder portion 15, extending in the circumferential direction of the rotary shaft 31 and disposed on both sides of each of the four first reinforcing ribs 18. Half-portions 20a of the eight fitting projections 20 extending in the axial direction project from the end of the cylinder portion 15 toward the second single axial-flow fan 3.

The first support-frame half-portion 13 includes a first support-frame-body half-portion 21 and eight first web half-portions 23A to 23H arranged between the first support-frame-body half-portion 21 and first housing-body half-portion 11. One web 23A of the eight first web half-portions 23A to 23H has a groove-shaped concave portion 23a opened toward the second single axial-flow fan 3.

The first support-frame-body half-portion 21 is of a circular plate in shape having an opening portion 21a in the center thereof. A first metal bearing holder 27 made of brass is fixedly fitted into the opening portion 21a (see FIG. 1). In the first support-frame-body half-portion 21, four first through-hole half-portions 29A to 29D that pass through the first support-frame-body half-portion 21 in the axial direction of first motor 7 are formed. The four first through-hole half-portions 29A to 29D are formed at equal intervals in the circumferential direction of the rotary shaft 31. One through-hole half-portion 29A of the four first through-hole half-portions 29A to 29D communicates with an internal space of the concave portion 23a of the web 23A. For example, the first through-hole half-portion 29B has two sides 29a and 29b opposed to each other in the radial direction of the rotary shaft 31 of the first motor 7 and two sides 29c and 29d opposed to each other in the circumferential direction of the rotary shaft 31. The sides 29a and 29b each have an arc shape, and the sides 29c and 29d each extend in the radial direction of the rotary shaft 31 of the first motor 7. The remaining two first through-hole half-portions 29C and 29D have the same configuration as that of the first through-hole half-portion 29B. How the four through-hole half-portions 29A to 29D work will be described in detail later.

Referring back to FIG. 1, the first motor 7 includes the rotary shaft 31, a stator 33, and a rotor 35. The rotary shaft 31 is rotatably supported onto the first bearing holder 27 by two bearings 34 fitted into the first bearing holder 27.

The stator 33 includes a stator core 37, exciting windings 39, and a circuit board 41. The stator core 37 is formed by lamination of a plurality of steel plates and is fixed to the first bearing holder 27. The stator core 37 includes a plurality of projecting pole portions 37a arranged in the circumferential direction of the rotary shaft 31. The exciting windings 39 are attached to the projecting pole portions 37a through insulators 43. The circuit board 41 is arranged along the first support-frame-body half-portion 21, being disposed apart from the first support-frame-body half-portion 21 by a predetermined distance. An exciting current supply circuit for flowing exciting current to the exciting windings 39 is mounted on the circuit board 41. In this embodiment, the exciting current supply circuit on the circuit board 41 and the exciting windings 39 are electrically connected by winding lead wires of the exciting windings 39 around a terminal pin 45 that passes through a through-hole of the circuit board 41 and is soldered to an electrode on the circuit board 41. A plurality of board through-holes 41a are formed in the circuit board 41. The board through-holes 41a are formed in the circumferential direction of the rotary shaft 31 at equal intervals. Air that has flown from around the stator 33 toward the four first through-hole half-portions 29A to 29D of the first support-frame-body half-portion 21 passes through the board through-holes 41a.

The rotor 35 includes an annular member 47 and a plurality of permanent magnets 49 fixed onto an inner peripheral surface of the annular member 47. The annular member 47 is fixed inside a peripheral wall portion 55 of a cup-like member 51 of the first impeller 9, described later.

With the above configuration, the first motor 7 is arranged within a first space S1 defined between the first support-frame half-portion 13 and suction port 19 such that an axial line of the rotary shaft 31 extends along a virtual center line L connecting the center of the suction port 19 and center of a discharge port 74 to be described later.

Figure 3:
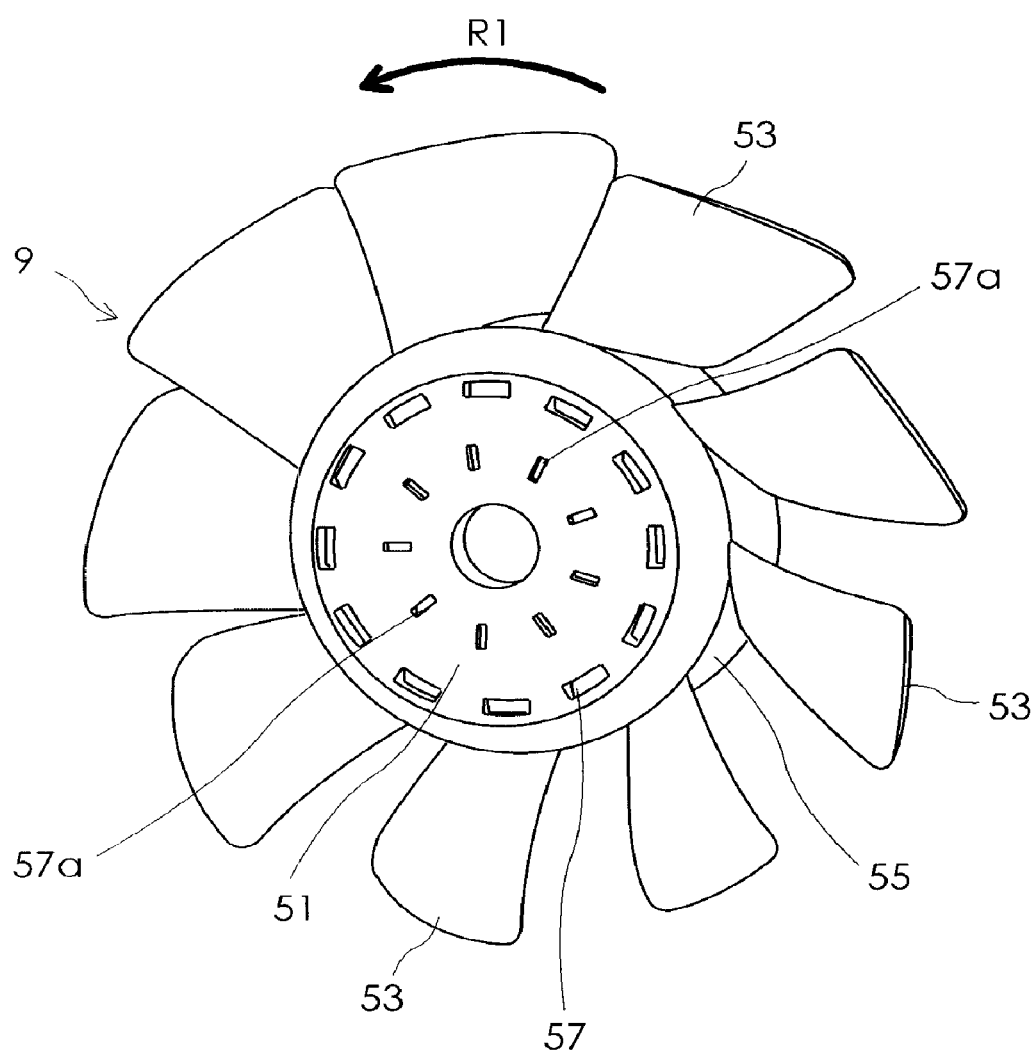
FIG. 3 is a perspective view showing a first impeller used in the counter-rotating axial-flow fan of FIG. 1.

As shown in FIG. 3, the first impeller 9 includes the cup-like member 51 and nine blades 53. The cup-like member 51 includes the peripheral wall portion 55 onto which the nine blades 53 are fixed and a bottom wall portion 57 integrally formed with one end of the peripheral wall portion 55. One end of the rotary shaft 31 of the first motor 7 is connected to the bottom wall portion 57. Nine vent holes 57a are formed in the bottom wall portion 57 and are disposed in the circumferential direction of the rotary shaft 31 at equal intervals. Each vent hole 57a has an elongated shape that extends in the radial direction of the rotary shaft 31 of the first motor 7. The nine vent holes 57a serve to introduce air sucked through the suction port 19 into an internal space of the first motor 7.

As described above, the annular member 47 of the rotor 35 is fixed inside the peripheral wall portion 55 of the cup-like member 51 of the first impeller 9. Thus, the first impeller 9 is rotated by the first motor 7 in a first rotating direction R1 (counterclockwise direction in FIG. 3) within the first space S1.

The second single axial-flow fan 3 includes a second housing unit 59, a second motor 61 arranged in the second housing unit 59, and a second impeller 63.

Figure 4:
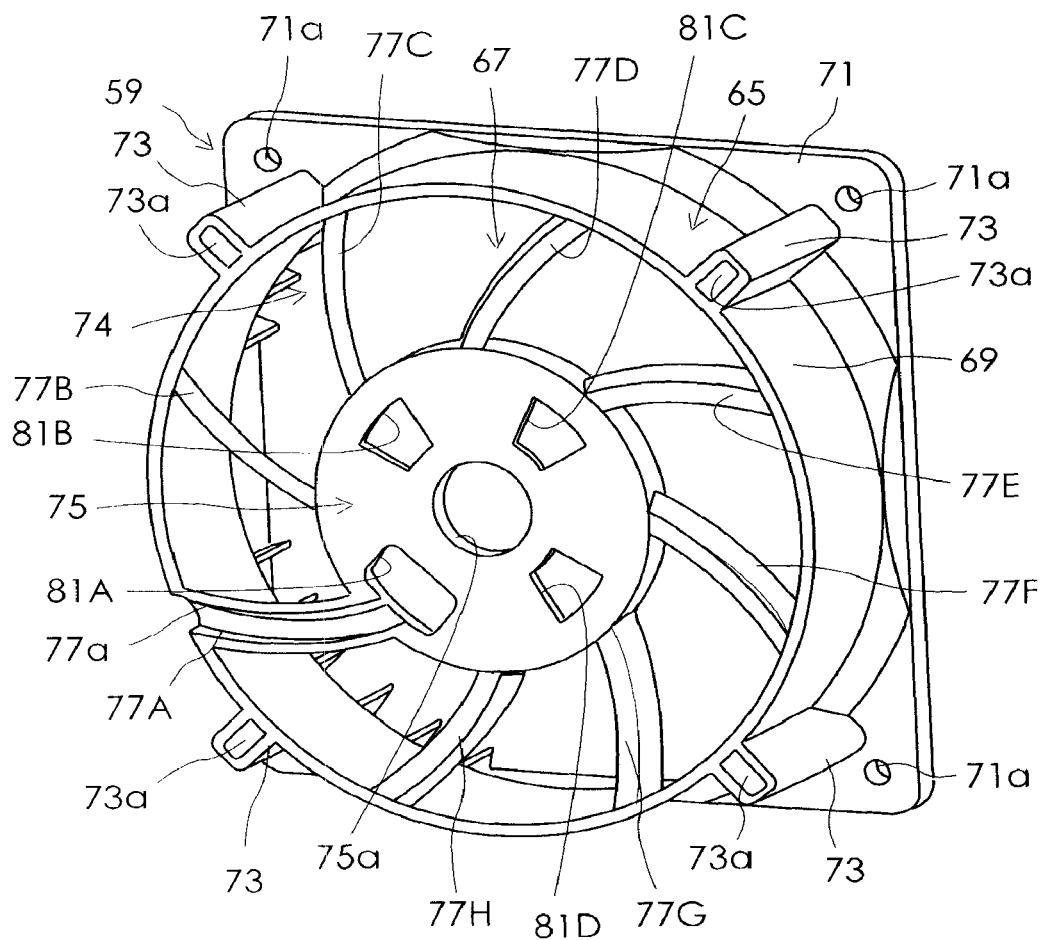
FIG. 4 is a perspective view showing a second housing unit used in the counter-rotating axial-flow fan of FIG. 1.
Figure 5:
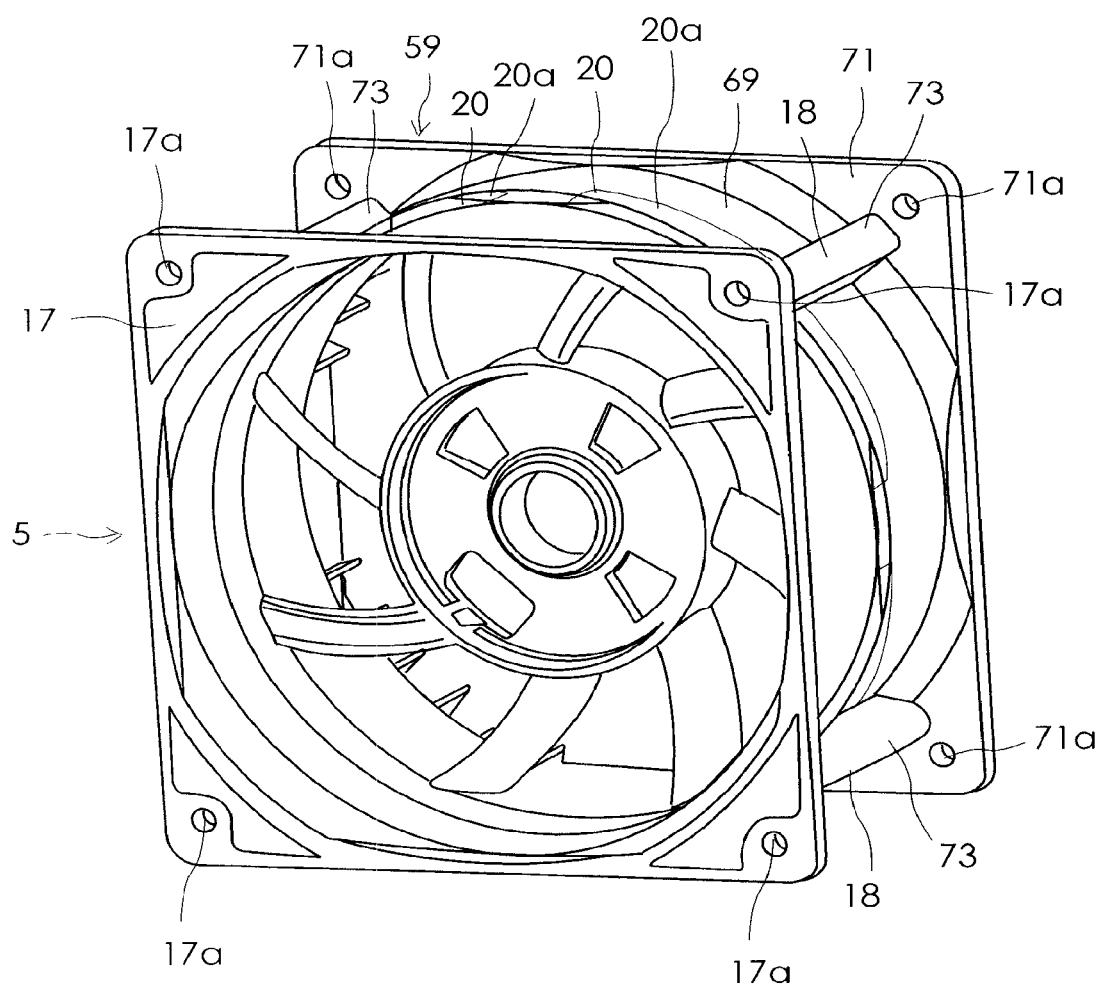
FIG. 5 is a perspective view of a housing formed by combining the first and second housing units used in the counter-rotating axial-flow fan of FIG. 1.

As shown in FIG. 4, the second housing unit 59, which is made of a synthetic resin or aluminum, integrally includes a second housing-body half-portion 65 and a second support-frame half-portion 67. The second housing-body half-portion 65 includes a cylinder portion 69, a discharge-side flange 71, and four reinforcing ribs 73. The cylinder portion 69 is of a cylindrical shape to form an air channel therein. The discharge-side flange 71 is provided on one end of the air channel. The discharge-side flange 71 has a square profile and has a discharge port 74 therein. At the four corners of the discharge-side flange 71, through-holes 71a through which fixtures for mounting the counter-rotating axial-flow fan to an electric appliance are inserted are formed. The four second reinforcing ribs 73 are arranged on the cylinder portion 69 at equal intervals in the circumferential direction of a rotary shaft 85 of the second motor 61, described later, and each have a hollow portion 73a therein extending in the axial direction. In the counter-rotating axial-flow fan of the present embodiment, the first housing unit 5 and second housing unit 59 are coupled to constitute a housing in the following manner as shown in FIG. 5. The distal ends of the four first reinforcing ribs 18 of the first housing-body half-portion 11 are fitted into the hollow portions 73a of the four second reinforcing ribs 73, respectively. Then, an outer periphery of the cylinder portion 69 is fitted into the half-portions 20a of the eight fitting projections 20 of the first housing-body half-portion 11 (see FIG. 1). Finally, the counter-rotating axial-flow fan is fitted to an electric appliance with the first housing unit 5 and second housing unit 59 being coupled by fixtures, not shown, such as bolts that pass through the through-holes 71a of the discharge-side flange 71 and through-holes 17a of the suction-side flange 17.

Referring back to FIG. 4, the second support-frame half-portion 67 includes a second support-frame-body half-portion 75 and eight second web half-portions 77A to 77H arranged between the second support-frame-body half-portion 75 and the second housing-body half-portion 65. One web 77A of the eight second web half-portions 77A to 77H has a groove-shaped concave portion 77a opened toward the first single axial-flow fan 1. The eight second web half-portions 77A to 77H are joined to the eight first web half-portions 23A to 23H, respectively to constitute eight webs (reference numeral 25 of FIG. 1) formed by stationary blades each having a streamlined cross-section. Further, a power supply wiring, not shown, is arranged in an inner portion surrounded by the concave portion 77a of the second web half-portion 77A and concave portion 23a of the first web half-portion 23A, and the power supply wiring will be connected to the exciting wirings of the first motor 7 and second motor 61 is arranged.

The second support-frame-body half-portion 75 is of a circular plate in shape having an opening portion 75a in the center thereof. A second metal bearing holder 79 made of brass is fixedly fitted into the opening portion 75a (see FIG. 1). The second bearing holder 79 and first bearing holder 27 contact each other thermo-conductively or in a heat conductive manner with the first housing unit 5 and the second housing unit 59 being coupled. In the second support-frame-body half-portion 75, four second through-hole half-portions 81A to 81D that pass through the second support-frame-body half-portion 75 in the axial direction of first motor 61 are formed. The four second through-hole half-portions 81A to 81D have the same shapes as those of the four first through-hole half-portions 29A to 29D. The four second through-hole half-portions 81A to 81D and four first through-hole half-portions 29A to 29D constitute four through-holes 83 with the first housing unit 5 and the second housing unit 59 being coupled (FIG. 1).

In the present embodiment, the second housing-body half-portion 65 and first housing-body half-portion 11 contact each other to constitute the housing body with the first housing unit 5 and the second housing unit 59 being coupled. Further, the second support-frame half-portion 67 and first support-frame half-portion 13 contact each other to constitute a motor support frame with the first housing unit 5 and the second housing unit 59 being coupled. In other words, the motor support frame is divided into two parts at the dividing plane to which a virtual center line L is a normal line, whereby the first support-frame half-portion 13 and second support-frame half-portion 67 are obtained.

The second motor 61 includes a rotary shaft 85, a stator 87, and a rotor 89. The rotary shaft 85 is rotatably supported onto the second bearing holder 79 by two bearings 91 fitted into the second bearing holder 79.

The stator 87 includes a stator core 93, exciting windings 95, and a circuit board 97. The stator core 93 is formed by lamination of a plurality of steel plates and is fixed to the second bearing holder 79. The stator core 93 includes a plurality of projecting pole portions 93a arranged in an circumferential direction of the rotary shaft 85. The exciting windings 95 are attached to the projecting pole portions 93a through insulators 99. The circuit board 97 is arranged along the second support-frame-body half-portion 75, being disposed apart from the second support-frame-body half-portion 75 by a predetermined distance. An exciting current supply circuit for flowing exciting current to the exciting windings 95 is mounted on the circuit board 97. In this embodiment, the exciting current supply circuit on the circuit board 97 and the exciting windings 95 are electrically connected by winding lead wires of the exciting windings 95 around a terminal pin 101 that passes through a through-hole of the circuit board 97 and is soldered to an electrode on the circuit board 97. In the circuit board 97, a plurality of board through-holes 97a are formed. The board through-holes 97a are formed in the circumferential direction of the rotary shaft 85 at equal intervals. Air that has flown through the four second through-hole half-portions 81A to 81D toward the stator 87 passes through the board through-holes 97a.

The rotor 89 includes an annular member 103 and a plurality of permanent magnets 104 fixed onto an inner peripheral surface of the annular member 103. The annular member 103 is fixed inside a peripheral wall portion 109 of a cup-like member 105 of the second impeller 36, described later.

With the above configuration, the second motor 61 is arranged within a second space S2 defined between the second support-frame half-portion 67 and discharge port 74 such that an axial line of the rotary shaft 85 extends along a virtual center line L connecting the center of the suction port 19 and the center of the discharge port 74.

As shown in FIG. 6, the second impeller 63 includes the cup-like member 105 and seven blades 107. The cup-like member 105 includes the peripheral wall portion 109 onto which the seven blades 107 are fixed and a bottom wall portion 111 integrally formed with one end of the peripheral wall portion 109. One end of the rotary shaft 85 is connected to the bottom wall portion 111. Twelve vent holes 111a are formed in the bottom wall portion 111 at positions apart from the rotary shaft 85 and arranged in the circumferential direction of the rotary shaft 85 at equal intervals. Each vent hole 111a has an elongated shape that extends in the circumferential direction of the rotary shaft 85. The twelve vent holes 111a serve to discharge air that has been introduced into an internal space of the second motor 61.

As described above, the annular member 103 of the rotor 89 is fixed inside the peripheral wall portion 109 of the cup-like member 105 of the second impeller 63. Thus, the second impeller 63 is rotated by the second motor 61 in a second rotating direction R2 (clockwise direction in FIG. 6) which is opposite to the first rotating direction within the second space S2.

In the counter-rotating axial-flow fan in this embodiment, shown by the arrow in FIG. 1, when the first impeller 9 rotates in the first rotating direction and the second impeller 63 rotates in the second rotating direction opposite to the first rotating direction, air sucked through the suction opening 19 is introduced through the nine vent holes 57a of the first impeller 9 into the internal space of the first motor 7. Then, part of the air introduced into the internal space of the first motor 7 sequentially passes outside the circuit board 41 or through plurality of board through-holes 41a and four through-holes 83 formed in the first housing unit 5 and second housing unit 59, and then introduced into the internal space of the second motor 61. The air that has been introduced into the internal space of the second motor 61 passes outside the circuit board 97 or through plurality of board through-holes 97a and then discharged to the outside through the twelve vent holes 111a of the second impeller 63. As described above, positions and a total cross sectional area of the four through-holes 83 are defined to guide the air that has been introduced into the internal space of the first motor 7 into the internal space of the second motor 61 so as to directly cool the stator 33 of the first motor 7 and stator 87 of the second motor 61. According to the counter-rotating axial-flow fan of this embodiment, the stator 33 of the first motor 7 and the stator 87 of the second motor 61 can directly be cooled by the air flow as described above. This increases effect of cooling the stator, whereby the temperature of the inside of the motor can be decreased.

A counter-rotating axial-flow fan according to the present embodiment and a counter-rotating axial-flow fan according to a comparative example were prepared for the testing purpose. The counter-rotating axial-flow fan according to a comparative example has the same configuration as that of the counter-rotating axial-flow fan according to the present embodiment except that the through-holes are not formed in the first and second housing units. More specifically, the first impellers 9 of both the counter-rotating axial-flow fans were rotated at 6000 rpm and second impellers 63 of the same were rotated 2500 rpm for 60 minutes, and increases in temperature of components (exciting wirings 39, transistor TR and zener diode ZD on the circuit board 41 which are provided in the first single axial-flow fan 1 and exciting wirings 95, transistor TR and zener diode ZD on the circuit board 97 which are provided in the second single axial-flow fan 3) of the respective counter-rotating axial-flow fans were measured. Table 1 shows results of the measurement.

TABLE 1

| | | Present Embodiment (C.°) | Comparative example (C.°) |
|---|---|---|---|
| First single axial-flow fan | Windings | 14.1 | 15.9 |
| | TR | 16.1 | 21.2 |
| | ZD | 15.9 | 20.3 |
| Second single axial-flow fan | Windings | 11.0 | 11.2 |
| | TR | 17.7 | 24.0 |
| | ZD | 18.2 | 21.4 |

As can be seen from Table 1, the counter-rotating axial-flow fan according to the present embodiment can suppress an increase in the temperature of all the components listed above as compared with the comparative example.

Although the housing is constituted by the first and second housing units coupled to each other through a coupling structure in the above embodiment, the housing may be formed by integral molding.

INDUSTRIAL APPLICABILITY

In the counter-rotating axial-flow fan in this embodiment, when the first impeller rotates in the first rotating direction and the second impeller rotates in the second rotating direction opposite to the first rotating direction, air sucked through the suction port is introduced into the internal space of the first motor. Then, part of the air introduced into the internal space of the first motor is introduced to the internal space of the second motor through one or more through-holes penetrating the support frame body. The stator of the first motor and the stator of the second motor can directly be cooled by the air flow as described above. In particular, if the temperature of the inside of the first motor which is likely to rise can be lowered, a counter-rotating axial-flow fan capable of making the most of the capability of the first and second motors can be obtained.

The invention claimed is:

1. A counter-rotating axial-flow fan comprising:
a housing including a housing body having an air channel formed therein and a motor support frame provided in a center portion of the air channel, the air channel having a suction portion on one end and a discharge port on the other end in an axial direction;
a first impeller arranged within a first space defined between the motor support frame and the suction port in the housing and including a plurality of blades;
a first motor that rotates the first impeller within the first space in a first rotating direction;
a second impeller arranged within a second space defined between the motor support frame and the discharge port in the housing and including a plurality of blades; and
a second motor that rotates the second impeller within the second space in a second rotating direction which is opposite to the first rotating direction,
the first and second motors each having a rotary shaft, a stator, and a rotor rotating around the stator,
the motor support frame including a support frame body positioned in the center portion of the air channel and a plurality of webs arranged between the support frame body and the housing body at predetermined intervals in a circumferential direction of the rotary shafts so as to connect the support frame body and the housing body,
the first and second motors being respectively arranged within the first and second spaces such that axial lines of the rotary shafts extend along a virtual center line connecting the center of the suction port and the center of the discharge port, the stator of the first motor and stator of the second motor being fixed onto the support frame body, wherein
the first impeller and the rotor of the first motor are configured to introduce air sucked from the suction port into an internal space of the first motor;
one or more through-holes which penetrate the support frame body in an extending direction of the axial line are formed in the support frame body; and
positions and a total cross sectional area of the one or more through-holes are defined to introduce the air, which has been introduced into the internal space of the first motor, into an internal space of the second motor so as to directly cool the stator of the first motor and the stator of the second motor.

2. The counter-rotating axial-flow fan according to claim 1, wherein the second impeller and the rotor of the second motor are configured to discharge the air, which has been introduced into the internal space of the second motor, to the outside.

3. The counter-rotating axial-flow fan according to claim 1, wherein the one or more through-holes are arranged at equal intervals in the circumferential direction of the rotary shafts.

4. The counter-rotating axial-flow fan according to claim 1, wherein the housing is constituted by first and second housing units that are coupled by a coupling structure,
the first housing unit includes a first housing-body half-portion having the suction port on one end thereof and the first space therein, and a first support-frame half-portion which is one of two parts obtained by dividing the motor support frame at a dividing plane to which the virtual center line is normal;
the second housing unit includes a second housing-body half-portion having the discharge port on one end thereof and the second space therein, and a second support-frame half-portion which is the other one of the two parts obtained by dividing the motor support frame at the dividing plane to which the virtual center line is normal; and
one or more through-hole half-portions are formed in the first and second support-frame half-portions, the through-hole half-portions being aligned together to form the one or more through-holes with the first and second housing units being coupled by the coupling structure.

5. The counter-rotating axial-flow fan according to claim 1, wherein
the first impeller includes a cup-like member having a peripheral wall portion onto which the plurality of blades are fixed and a bottom wall portion which is integrally formed with one end of the peripheral wall portion and to which one end of the rotary shaft is fixed;

the rotor includes an annular member disposed inside the peripheral wall portion of the cup-like member and a plurality of permanent magnets fixed onto an inner peripheral surface of the annular member, and one or more vent holes are formed in the bottom wall portion of the cup-like member of the first impeller, through which the air that has been introduced through the suction port is introduced into an inside of the cup-like member.

6. The counter-rotating axial-flow fan according to claim 1, wherein the stators of the first and second motors each include a stator core, exciting windings attached to the stator core, and a circuit board on which an exciting current supply circuit is mounted for flowing exciting current to the exciting windings;

the circuit boards of the first and second motors are each arranged along the support frame body, being disposed apart from the support frame body by a predetermined distance; and one or more board through-holes are formed in the circuit boards, through which the air that is directed to the one or more through-holes or air that has passed through the one or more through-holes passes.

7. The counter-rotating axial-flow fan according to claim 4, wherein the first support-frame half-portion has a first support-frame-body half-portion constituting a half portion of the support frame body;

the second support-frame half-portion has a second support-frame-body half-portion constituting the remaining half portion of the support frame body;

a first bearing holder, into which a bearing for supporting the rotary shaft of the first motor is fitted, is fixed to a center portion of the first support-frame-body half-potion;

a second bearing holder, into which a bearing for supporting the rotary shaft of the second motor is fitted, is fixed to a center portion of the second support-frame-body half-potion; and the first and second bearing holders thermo-conductively contact each other with the first and second housing units being coupled.

8. The counter-rotating axial-flow fan according to claim 7, wherein the first and second bearing holders are made of metal.

* * * * *